United States Patent
Bank et al.

(10) Patent No.: US 9,070,147 B2
(45) Date of Patent: Jun. 30, 2015

(54) SYSTEM TO FACILITATE SHARING USING CONTINGENCY ORDERING

(75) Inventors: Judith H. Bank, Morrisville, NC (US);
Lisa M. W. Bradley, Cary, NC (US);
Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 459 days.

(21) Appl. No.: 13/414,304

(22) Filed: Mar. 7, 2012

(65) Prior Publication Data

US 2013/0238464 A1    Sep. 12, 2013

(51) Int. Cl.
  *G06Q 30/00*    (2012.01)
  *G06Q 30/06*    (2012.01)
  *G06Q 10/10*    (2012.01)
  *G06Q 50/00*    (2012.01)

(52) U.S. Cl.
  CPC ............... *G06Q 30/06* (2013.01); *G06Q 10/10* (2013.01); *G06Q 50/01* (2013.01)

(58) Field of Classification Search
  CPC ........ G06Q 30/06; G06Q 50/01; G06Q 10/10
  USPC ......... 705/26.1, 26.41, 26.7, 27.1, 14.73, 1.1, 705/14.23, 14.26, 14.39, 14.51
  See application file for complete search history.

(56) References Cited

U.S. PATENT DOCUMENTS

| | | | |
|---|---|---|---|
| 7,970,661 B1 | 6/2011 | Abraham et al. | |
| 8,707,185 B2 * | 4/2014 | Robinson et al. | 715/751 |
| 2008/0091546 A1 * | 4/2008 | Kirovski et al. | 705/26 |
| 2009/0281843 A1 * | 11/2009 | Coffman et al. | 705/5 |
| 2010/0023418 A1 * | 1/2010 | Bader et al. | 705/26 |
| 2010/0180232 A1 | 7/2010 | Honan et al. | |
| 2012/0166261 A1 * | 6/2012 | Velusamy et al. | 705/14.16 |
| 2012/0226587 A1 * | 9/2012 | de Lara | 705/27.1 |
| 2013/0159132 A1 * | 6/2013 | Adams | 705/26.7 |
| 2013/0268377 A1 * | 10/2013 | Jessup et al. | 705/14.73 |

OTHER PUBLICATIONS

Group Deals- Plugin, Groupdealspluggin.com, Created Jan. 25, 2011.
Twongo, Twongo the Power of Team Buying, www.twongo.com, 2012.
Twongo, How it Works, www.twongo.com/pages/how-it-works, 2012.
Groupon, Learn About Groupon, Groupon: Collective Buying Power, www.groupon.com/learn, 2012.

* cited by examiner

*Primary Examiner* — Yogesh C Garg
(74) *Attorney, Agent, or Firm* — Scully, Scott, Murphy & Presser, P.C.

(57) ABSTRACT

Purchase order information associated with an item from a first user may be stored initially without completing a purchase transaction. In one aspect, the first user may be enabled to select one or more second users with whom to share the purchase. In another aspect, one or more second users may be given an opportunity to purchase the same instance of an item and share it. In response to determining that a minimum subset of the selected one or more users have indicated to purchase the item, the purchase transaction may be processed and completed. Completion of the purchase may be contingent on the selected one or more second users also purchasing the same item or the same instance of the item. An event may be optionally added to the users' calendars wherein they share the use of the item(s).

17 Claims, 4 Drawing Sheets

SYSTEM TO FACILITATE SHARING USING CONTINGENCY ORDERING

FIELD

The present application relates generally to computers, and computer applications, information technology, and more particularly to computer system and methodologies to facilitate sharing of a purchase and jointly using a purchased item by providing a method for contingency ordering.

BACKGROUND

The Internet or World Wide Web (Web) sites that advertise coupons and special bargain deals have increased in number and types of offers. Many of those sites, however, require a minimum purchase in order to qualify to receive the discounts offered through the coupons or bargains. For a single shopper, the minimum required purchase amount may exceed the amount the shopper would like to spend. Even with sites such as Groupon™ and Twongo™, which include a group component, a particular user still needs to pay for the product at the offered price. Other sites exist that may provide sharing shopping carts among a group of people, for example, in a social network. While those sites may allow multiple products to be bought together in a shared shopping cart, there is no automated mechanism for shoppers to buy a product or a bulk product with others, e.g., splitting the cost among the group of people and scheduling a time to share the item together. Other restrictions in currently offered discounts via such Web sites include time restrictions, such as expiration dates only a few days away, which makes it difficult for a user to gather a group with whom to make the purchase in time.

BRIEF SUMMARY

A method of facilitating sharing of a purchase, in one aspect, may include receiving purchase order information associated with an item from a first user. The method may also include storing initially the received purchase order information from the first user in a memory device without completing a purchase transaction associated with the item. The method may also include enabling the first user to select one or more second users. The method may further include, if it is determined that a minimum number of the selected one or more users have indicated to purchase a same instance of the item, completing the purchase transaction associated with the item.

A method of facilitating sharing of a purchase, in another aspect, may include receiving purchase order information associated with an item from a first user. The method may also include storing initially the received purchase order information from the first user in a memory device without completing a purchase transaction associated with the item. The method may further include enabling the first user to select one or more second users. The method may yet further include transmitting a notification to the selected one or more second users requesting the selected one or more second users to purchase the same item. The method may still yet include determining whether a minimum subset of the selected one or more users have indicated to purchase the same item; and if it is determined that the minimum subset of the selected one or more users have indicated to purchase the same item, completing the purchase transaction associated with the item. The completion of the first user's purchase of the item may be contingent on the selected one or more second users also purchasing the item. The method in another aspect may further include optionally scheduling a time on the calendars of the first and second users when they can jointly partake in use of the item.

A system for facilitating sharing of a purchase, in one aspect, may include a memory device, and a contingency purchase module operable to execute on a processor. The contingency purchase module may be operable to receive purchase order information associated with an item from a first user. The contingency purchase module may be further operable to store initially the received purchase order information from the first user in a memory device without completing a purchase transaction associated with the item. The contingency purchase module may be further operable to enable the first user to select one or more second users. The contingency purchase module may be also operable to transmit a notification to the selected one or more second users requesting the selected one or more second users to purchase the same item. Still yet, the contingency purchase module may be operable to determine whether a minimum subset of the selected one or more users have indicated to purchase the same item. The contingency purchase module may be further operable to complete the purchase transaction associated with the item if it is determined that the minimum subset of the selected one or more users have indicated to purchase the same item. The method in another aspect may further include optionally scheduling a time on the calendars of the first and second users when they can jointly partake in use of the item.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The methodologies of the present disclosure in one embodiment facilitate purchasing items (e.g., products, services) with others, for instance, so as to meet the minimum requirements to qualify for discounts or coupon offers, divide costs with the others, or for any other reasons. The methodologies of the present disclosure in one embodiment allow a purchaser to form a group to be able to jointly purchase a product. For instance, users, who may be socially related, are enabled to share the discount information or other purchase information about a product, and make purchases together, wherein the actual purchase transaction occurring is contingent on others purchasing the same product. In the present disclosure, the term "product" is generally used to refer to purchase items; that term is meant to include any objects, items, services and others that may be purchased.

Items may cost more than the amount a person is willing to pay; however, those same items could be appealing for larger groups of people despite the cost if purchased together. Consider for example a dinner discount of 25 percent (%) for a minimum spending amount of $100 (US dollars). One person, or even a couple might not want to spend $100 for dinner to get 25%, but if more friends joined the group, the group together could spend that much. Another concern may be coordinating the purchase with the others in time before any discount offers expire. The methodologies of the present disclosure in one embodiment facilitate and automate the sharing of coupons or bulk purchase items by two or more people, for instance, who may be socially related.

In addition to facilitating the sharing of purchase discounts or coupons, the methodologies of the present disclosure may facilitate enjoying activities together with friends or others. Many offers such as gym classes, facials, haircuts, restaurant food, theater tickets, etc., can be much more fun to a person if someone that person knows accompanies that person. The methodologies of the present disclosure in one embodiment may significantly increase the user's likelihood to purchase these offers.

Figure 1:
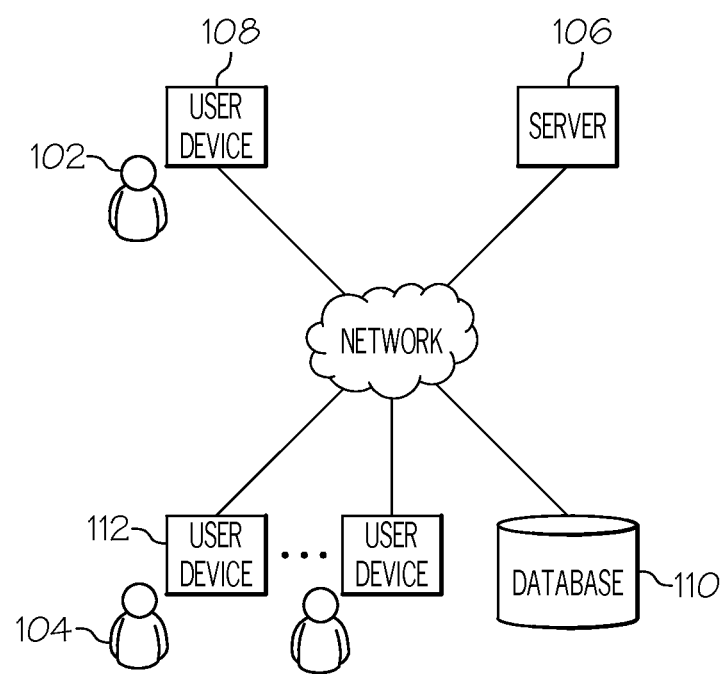
FIG. 1 is a schematic diagram illustrating an overview of the methodology of the present disclosure in one embodiment.

FIG. 1 is a schematic diagram illustrating an overview of the methodology of the present disclosure in one embodiment. In one embodiment of the present disclosure, a user (e.g., referred to as User A) 102 is allowed to conditionally select a coupon or discount or other offer associated with a product and notify one or more friends 104 about the user's intention to purchase the product. The user 102 may initiate the purchase associated with the offer as usual, however, the order would not be processed or activated until another one or more users (B) 104, designated by user A 102, also accepted the offer. One or more users (User Bs) may be selected from a group or a buddy list, from a social network, or other known list or combinations thereof. In response to the user B 104 accepting the offer, the purchase order is processed to complete the purchase transaction. The charges for the selected purchase may be optionally divided according to a number of algorithms. Additionally, time slots may be scheduled via a social networking site on one's calendar for the user 102 to use the offer with the friend(s) 104 before the expiration date.

In one embodiment of the present disclosure a server 106, for example, the web server that is offering the product and/or discount, may implement the methodologies of the present disclosure. In another embodiment, a plugin such as a World Wide Web (Web) plugin may implement the functionalities to support the methodologies of the present disclosure. If a Web administrator chose not to directly support this function on the Web server, it may be optionally down loaded as a plugin by users wishing to exploit it on Web sites that did not offer the function.

The user 102 may, for instance, using his or her computer device or smart phone device or another device 108 may connect to a Web server 106 that is offering a product with discounts and browse through the pages of the Web site. A new "share" button or the like or another user interface component may be presented on Web pages for users to optionally select and display a shopping cart or purchase order status. When the server 106 or a plugin detects that the user has navigated to a Web page wherein a purchase is being made, the "share" button or like user interface component may be displayed. Selecting or clicking this button or like component in one embodiment of the present disclosure presents or displays a list of users with whom the purchase may be shared, for example, previously designated sharing friends. This list, for example, may contain a subset of the user's buddy list, a list of specific names, user identifiers, email addresses, an address book, a social network, etc. The user 102 may be enabled to select individuals from the list(s) or to select the entire list. One or more email addresses or social network identifiers or other identifiers may be used to designate each participant for purchase tracking purchases. For example, the user may specify the identity of individuals selected to share a purchase by choosing from a list or display of various types, such as a community, a social networking site like Facebook™, an address book, an Instant Message buddy list, a phone buddy list, etc. In response to the user selecting one or more users 104 to share the purchase offer, the server 106 or the plugin may send the notifications to the selected users 104 notifying the users 104 of the available purchase offer and the initial user's desire to share via for example user devices 112.

The methodologies of the present disclosure may also allow a user to choose an algorithm to use for dividing the cost. For example, the user 102 can optionally express a percent interest, or the number of people required for the purchase. For example, if the user 102 indicates he has a 25% interest, one or more friends should be located to accept the additional 75% before the product or offer can be purchased. Once the aggregate interest level reaches 100% the purchase will be made. The user 102 could also indicate he needs three additional friends to join the group purchase.

The initial user 102 continues to complete the required information in the order form or shopping cart, and optionally selects a percent interest, and indicates this is a conditional purchase. When the order form is complete, the server 106 or the plugin captures the information from the purchase order and stores it. In one embodiment, the purchase order information may be stored in a directory on the user computer or like device 108. In another embodiment of the present disclosure, the purchase order information may be stored in a shared database or the like 110. The stored data may be encrypted; e.g., sensitive information such as credit card numbers or other sensitive data may be encrypted.

If the purchase order information is stored in a shared database, the server 106 or the plugin may for example search the shared database to see if others on the user's buddy list have already accepted the offer. The shared information may also be used to facilitate the completion of a shopping order (e.g., by partially filling in the shopping cart or order form with the product code, description, quantity, etc.). If others have accepted and all conditions have been met, the purchase is made using the captured information. If others also made conditional purchases, the server 106 can automatically complete their purchases if shopping cart information is stored in the shared database.

If the purchase order information is stored locally on the users' machines, the server 106 or the plugin may notify the other users 104 to complete their purchases. Notification may be sent to those individuals sharing a purchase using the contact information provided when the sharing users are specified. For example, the server 106 or the plugin may send email or an instant message or post on social network site, or via another communication method, with a location address, e.g., uniform resource locator (URL) of the Web site for the final purchase confirmation or can launch a browser on a friend's personal computer if the friend is on line at the time. When the notified users visit the location address, e.g., the URL, their purchase orders are automatically filled in using the information previously stored. The server 106 or the plugin may optionally divide the cost among the group participants either equally, or according to the percent of interest they specified. The users 102, 104 can also choose to have one person purchase the item and divide the costs among themselves.

If designated users sharing in a group purchase are found to be online at the time the purchase initiator is ordering a shared item, the server or plugin may open a browsing session for each online designated user and display a purchasing page or shopping cart containing the shared item. The designated user may then have the option of filling in additional required information, such as credit card number, and conditionally joining in the purchase. This functionality further facilitates the group purchase of the item.

Once the purchase is made, or the expiration date has passed, the sever 106 or the plugin optionally may delete related information from the database and/or the user's personal computer.

In one embodiment of the present disclosure, database systems such as Microsoft® Access® that can be accessed over the Internet may be utilized to implement the shared database 110. The database 110 may track shared interest in purchases and offers.

Yet in another embodiment of the present disclosure, the methodologies of the present disclosure may interface with calendar systems of users to coordinate sharing of purchases and activities. For example, the methodologies of the present disclosure may access calendar systems (or the like functionality) of users to determine the availability of friends (or other people in the initial user's network) who could potentially share purchases. For instance, if the initial user is purchasing tickets for a theater event (or any other activity) on a designated date, the calendar systems of other users may be checked to determine whether or which friends are available that day. This functionality may be utilized to present or display to the user the list of friends to select for sharing a purchase.

After the purchases are made, the methodologies of the present disclosure (e.g., via the web server 106 or the plugin) may coordinate purchases, for example, by publishing calendar events associated with the group purchase to the users in the group. So, for example, if a purchase was for a dinner for the group, the methodologies of the present disclosure in one embodiment may enable posting of the dinner event on the calendar system (e.g., Microsoft® Outlook® calendar, Lotus Notes® calendar) of those in the group.

Figure 2:
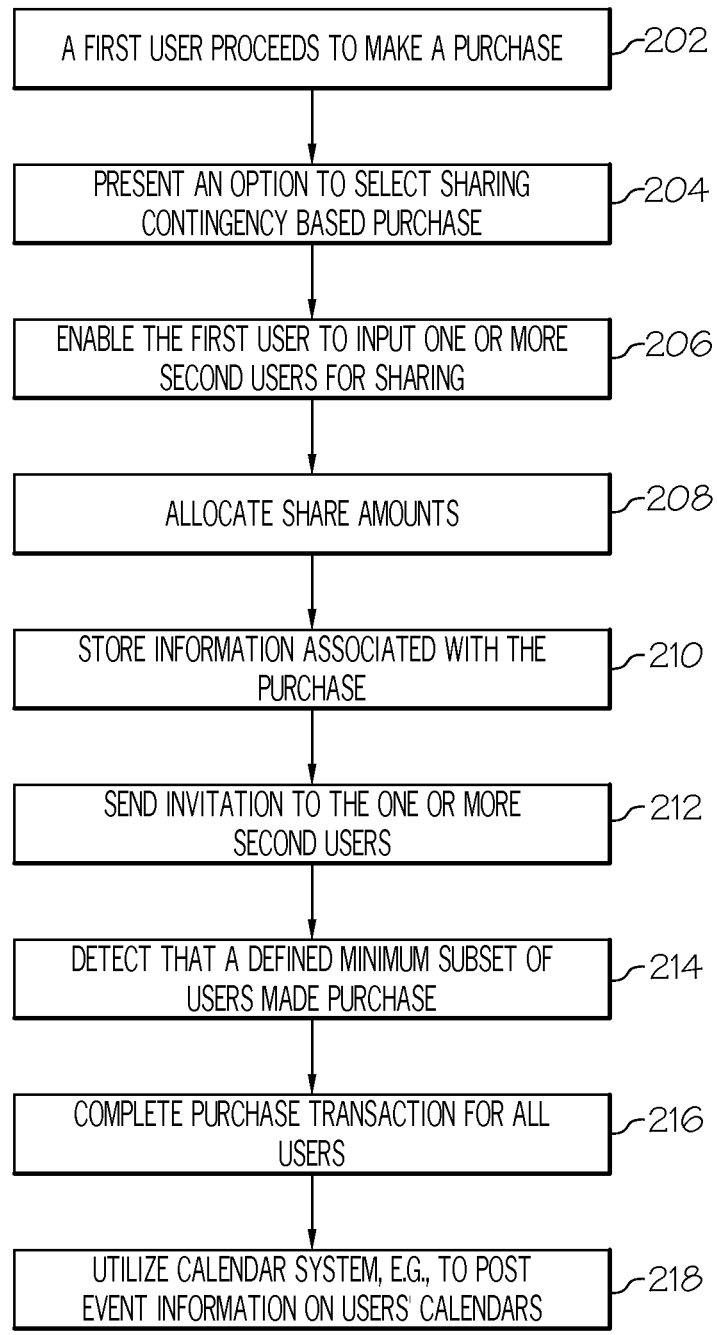
FIG. 2 is a flow diagram illustrating a method that facilitates sharing of purchases based on contingency orders in one embodiment of the present disclosure.

FIG. 2 is a flow diagram illustrating a method that facilitates sharing of purchases based on contingency orders in one embodiment of the present disclosure. At 202, a user (referred to herein as a first user for sake of explanation only) proceeds to purchase a product, for example, based on an interested offer that, for example, includes discounts or coupons. The purchase, for instance, occurs on the Internet electronically, by the user navigating the Web site of the seller. At 204, the Web page of the Web site may include an option that the user can select to indicate one or more contingencies for the purchase, e.g., whether the purchasing is to be shared, or whether the purchase is not to be shared but would like to purchase only if one or more of second users (e.g., friends) purchase the product also. For example, a functionality of the present disclosure (e.g., via the server of the seller's Web site, or a plugin or another application) detects that the user has navigated to the purchasing page and may display or otherwise present on the page a user interface component such as a button or another selectable component that enables the user to indicate the desire to share based on contingency.

At 206, in response to the first user selecting the option to indicate the contingency based purchase, the functionality of the present disclosure in one embodiment may enable the first user to indicate one or more second users with whom the first user would like to share the purchase or activity. For instance, the functionality of the present disclosure may present to the user a list of second users from which to choose for sharing the purchase or activity. The first user may also manually input the one or more second users by identifiers such as email addresses, social network identifiers, and others.

At 208, if the first user indicated that the purchase is to be shared, the first user may also input the allocation amount the first user is willing to pay and the amount the first user would like the rest of the users in the group to pay such that the cost of the purchase may be split among the first and second users. The entered amount may be in the form of fixed monetary denomination, percentage of the cost, ratio, and others.

At 210, the first user's purchase information is stored. At this point, in one embodiment of the present disclosure, the actual purchase transaction does not take place, because the purchase is contingent on the one or more second users also making the purchase.

At 212, a notification or invitation is sent to the indicated one or more second users. For example, if the first user selected to share the purchase, the functionality of the present disclosure may send a purchase invitation to the specified one or more second users to share the purchase. If the first user selected to not share the purchase, the functionality of the present disclosure may send a purchase invitation to the specified one or more second users indicating that the purchase is not to be shared, but that the first user wishes the other to join the purchase to enjoy the purchase offer together. In one embodiment of the present disclosure the notification may be in the form of opening or launching the browser of an on line group member when one person in the group is shopping for a shared purchase item. So for example, a browser of the one or more second users who are on line may open up to the Web page (or like application interface) that would allow the one or more second users to also purchase the product. In this respect, the Web page may be partially filled in with the purchase information already entered by the first user. Such purchase information may include the information on the product being purchased, total cost, the amount the one or more second users are expected to pay, and other information needed to process a purchase order.

At 214, the functionality of the present disclosure in one embodiment detects that all or a minimum subset of invited one or more second users have made the same purchase pertaining to the invitation. For instance, the one or more second users invited to make the purchase together, may be given a URL to navigate to in order to make the purchase. The purchase information of the one or more second users is also stored until all or a minimum subset of indicated one or more second users make the purchase. Once it is detected that all or a minimum subset of users invited to share the purchase or enjoy the offer, have also made the purchase, the functionality of the present disclosure in one embodiment at 216 completes the purchase transaction of the first user, and the one or more second users involved in the condition. A minimum subset of the second users may be configurable, for example, by the first user, and may include a number of second users or specific identities of one or more second users. For example, minimum subset may be a minimum number of second users that is needed to make the purchase, or one or more specific second users needed to make the purchase.

At 218, sites such as social network sites may leverage user's calendar information to schedule calendar events before the offer expiration date with the friends so friends can enjoy the offer together.

Figure 3:
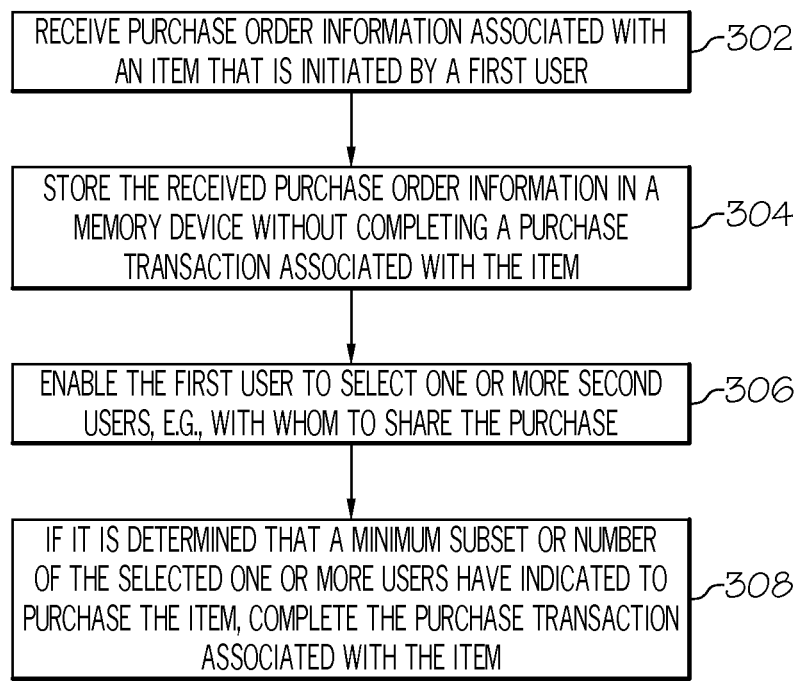
FIG. 3 is a flow diagram illustrating a method of facilitating purchasing in another aspect.

FIG. 3 is a flow diagram illustrating a method of facilitating purchasing in another aspect. At 302, purchase order information associated with an item that is initiated by a first user may be received. At 304, the received purchase order information may be stored in a memory device without completing a purchase transaction associated with the item. At 306, the first user may be enabled to select one or more second users, e.g., with whom to share the purchase. At 308, if it is determined that a minimum number or a minimum subset of the selected one or more second users have indicated to purchase the item, the purchase transaction associated with the item may be completed. The minimum number may be a predetermined number or a threshold value, which may be configurable, for example, by the first user. In one embodiment, the selected one or more second users indicate to purchase the same instance of the item (e.g., single item or a bulk item), and the purchase amount for the item may be divided among the first user and one or more second users. In another embodiment, the selected one or more second users may indicate to purchase different instances of the item, (e.g., multiple instances of the item), and the first and one or more second users may each pay for the instance of the item each purchases. A minimum subset of the second users may be configurable, for example, by the first user, and may include a number of second users or specific identities of one or more second users. For example, minimum subset may be a minimum number of second users that is needed to make the purchase, or one or more specific second users needed to make the purchase.

The methodologies of the present disclosure in one embodiment enable collectively utilizing by members of a group a shared service or a shared item such as a bulk purchase, dinner at a restaurant, and tickets to an event that the group would attend together, where the item purchased is divided among the group. The methodologies of the present disclosure in one embodiment also may provide an ability to abort the purchase if there is an insufficient number of group members willing to make the purchase, or if one or more members decline to make the purchase. The members of the group may be friends or acquaintances who wish to share a product or service. The purchase transaction thus is completed contingent on the fact that others also want to make the purchase and are joining in the buying. The purchase transaction is not committed until the others have joined.

The methodologies of the present disclosure in one embodiment facilitate the sharing of items or services by a group of buyers. In one embodiment of the present disclosure, the members of the group are selected by the person who originally finds the deal and wants to either share a product or service with his/her friends or wishes to attend an event only if his/her friends also agree to attend. Multiple purchases related to an event such as transportation and event tickets may be coordinated with the methodologies of the present disclosure. If the shared purchase involves tickets to an event, the methodologies of the present disclosure may find a mutually acceptable date and add the event to the calendars of the group members.

The methodologies of the present disclosure in one embodiment provide an ability to link a contingency and/or group purchase to a specific event or a specific date and time that can be scheduled on purchasers' calendars. For example, if the purchase is for 10 theater tickets, a user may optionally specify that the event be scheduled with 9 specific friends selected from a list such as members of the buddy list, social network, and/or others. This functionality may be linked to a calendar system, or on line calendar, such that the event would appear on the calendars of the participants once the tickets were purchased. Furthermore, if any of the 9 selected friends had conflicting items on their calendars, they may be replaced by others on the list or a mutually acceptable alternate date may be chosen. The methodologies of the present disclosure may apply to any purchase involving a group and a specific date and time, e.g. dinner, theater, sports events, vacations, etc. Events may include those which require the purchase of a certain number of offers (e.g., tickets) to receive a discount, or just to purchase a product or service and coordinate this purchase with selected individuals such that the event organizer can enjoy using the offer with a minimum number of other people. The methodologies of the present disclosure may also coordinate multiple purchases related to a single event, such as bus rental for travel to a show in a nearby town. Both the bus rental and the show tickets could be scheduled as a contingency purchase.

Thus, for example, the item may be associated with an event occurring in specified timeframe, the specified timeframe including time, date or day of week or other time specification, or combinations thereof, and electronic calendar systems associated with the first user and the selected one or more second users are automatically updated with posting of the event on the specified timeframe, or the electronic calendar systems are automatically searched to find commonly available time among the users within said specified timeframe wherein the event is posted on the electronic calendar systems at the commonly available time, or combinations thereof. Some events may have specific time, and other events may have a use by date, or other restrictions. The methodology of the present disclosure may include automatically searching the electronic calendars of the users to determine the appropriate date or time to meet the restriction requirements such as use by certain date, use of certain day of the week (e.g., valid only on Thursdays). Further more, the methodologies may look for those days or time that are commonly available among, or that work for, the users who purchased the item together, as well as meeting the restriction requirements.

Figure 4:
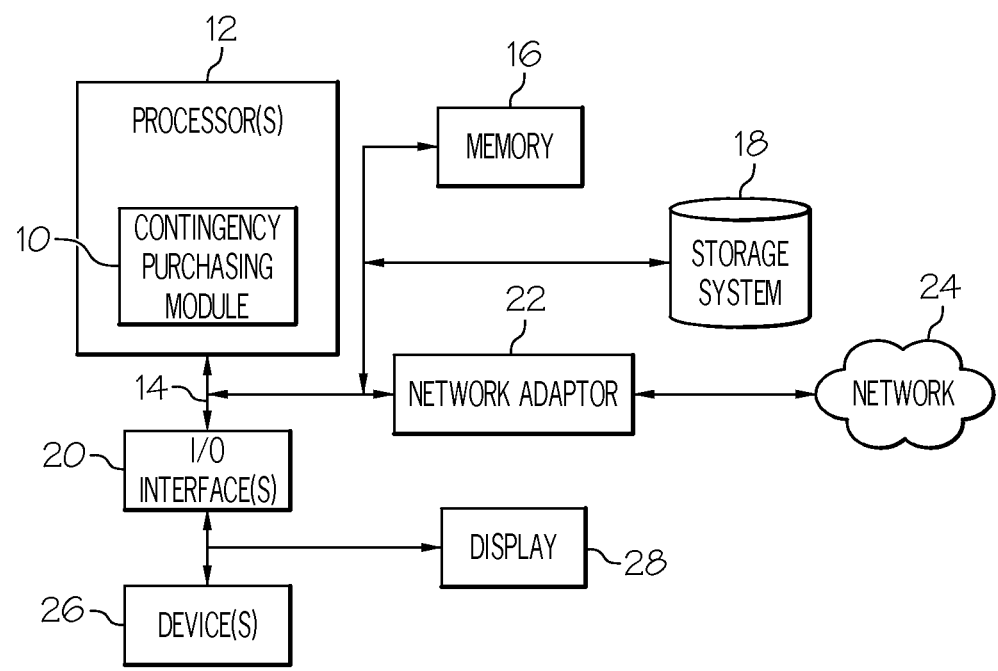
FIG. 4 illustrates a schematic of an example computer or processing system that may implement the contingency purchasing system in one embodiment of the present disclosure.

FIG. 4 illustrates a schematic of an example computer or processing system that may implement the contingency purchasing system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a contingency purchasing module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of facilitating sharing of a purchase, comprising:
   detecting, automatically by a processor, a navigation to a web page from which an item can be purchased;
   responsive to detecting the navigation to the web page, presenting a share user interface component on the web page, the share user interface component for allowing a first user to choose an option to share purchasing of the item with others;
   receiving purchase order information associated with the item entered on the web page, from the first user;
   storing initially the received purchase order information from the first user in a memory device without completing a purchase transaction associated with the item;
   responsive to the first user choosing the share user interface component, and prior to completing the purchase transaction associated with the item, presenting a list of one or more second users from which the first user is allowed to select;

receiving the selected one or more second users responsive to the first user selecting the one or more second users;

transmitting, by the processor, notification to the selected one or more second users requesting the selected one or more second users to purchase the item, the transmitting comprising at least automatically launching and opening a second user interface on one or more devices respectively of the selected one or more second users, the second user interface having at least some of the purchase order information populated on the second user interface, responsive to determining the selected one or more second users are online and browsing to purchase the item;

determining whether a minimum subset of the selected one or more users have indicated to purchase the item; and if it is determined that the minimum subset of the selected one or more users have indicated to purchase the item, completing the purchase transaction associated with the item, wherein the completion of the first user's purchase of the item is contingent on the selected one or more second users also purchasing the item.

2. The method of claim 1, wherein the web page includes a web browser page displaying a web page of a web server.

3. The method of claim 1, wherein the step of transmitting further includes:

automatically sending an electronic mail to the selected one or more users;

automatically sending an electronic message to the selected one or more users; or automatically posting the notification on a social network page of the selected one or more users; or combinations thereof.

4. The method of claim 1, wherein the method further includes automatically dividing cost of the item among the first user and the selected one or more users.

5. The method of claim 1, wherein the method further includes enabling the first user to specify how cost of the item should be divided among the first user and the selected one or more users.

6. The method of claim 1, wherein the item is associated with an event occurring in specified timeframe, the specified timeframe including time, date or day of week or combinations thereof, and electronic calendar systems associated with the first user and the selected one or more second users are automatically updated with posting of said event on said specified timeframe, or the electronic calendar systems are automatically searched to find commonly available time within said specified timeframe wherein the event is posted on the electronic calendar systems at the commonly available time, or combinations thereof.

7. A system for facilitating sharing of a purchase, comprising:

a processor;

a memory device; and a contingency purchase module operable to execute on the processor and, the contingency purchase module further operable to detect a navigation to a web page on which an item can be purchased;

responsive to detecting the navigation to the web page, the contingency purchase module further operable to present a share user interface component on the web page, the share user interface component for allowing a first user to choose an option to share purchasing of the item with others;

the contingency purchase module further operable to receive purchase order information associated with the item entered on the web page from the first user, the contingency purchase module further operable to store initially the received purchase order information from the first user in a memory device without completing a purchase transaction associated with the item, responsive to the first user choosing the share user interface component, and prior to completing the purchase transaction associated with the item, the contingency purchase module further operable to present a list of one or more second users from which the first user is allowed to select, the contingency purchase module further operable to receive the selected one or more second users responsive to the first user selecting the one or more second users, the contingency purchase module further operable to transmit notification to the selected one or more second users requesting the selected one or more second users to purchase the item, the contingency purchase module further operable to determine whether a minimum subset of the selected one or more users have indicated to purchase the item, and the contingency purchase module further operable to complete the purchase transaction associated with the item if it is determined that the minimum subset of the selected one or more users have indicated to purchase the item, wherein the contingency purchase module is further operable to transmit the notification by: automatically launching and opening a second user interface on one or more devices respectively of the selected one or more users, the second user interface having at least some of the purchase order information populated on the second user interface, responsive to determining the selected one or more second users are online and browsing to purchase the item.

8. The system of claim 7, wherein the web page includes a web browser page displaying a web page of a web server, and the selection component is included on the web page.

9. The system of claim 7, wherein the contingency purchase module further operable to transmit the notification by:

automatically sending a electronic mail to the selected one or more users;

automatically sending an electronic message to the selected one or more users; or automatically posting the notification on a social network page of the selected one or more users; or combinations thereof.

10. The system of claim 7, wherein the contingency purchase module is further operable to automatically dividing cost of the item among the first user and the selected one or more users.

11. The system of claim 7, wherein the contingency purchase module is further operable to enable the first user to specify how cost of the item should be divided among the first user and the selected one or more users.

12. The system of claim 7, wherein the item is associated with an event occurring in specified timeframe, the specified timeframe including time, date or day of week or combinations thereof, and electronic calendar systems associated with the first user and the selected one or more second users are automatically updated with posting of said event on said specified timeframe, or the electronic calendar systems are automatically searched to find commonly available time within said specified timeframe wherein the event is posted on the electronic calendar systems at the commonly available time, or combinations thereof.

13. A computer readable storage medium storing a program of instructions executable by a machine to perform a method of facilitating sharing of a purchase, comprising:

detecting, automatically by a processor, a navigation to a web page from which an item can be purchased;

responsive to detecting the navigation to the web page, presenting a share user interface component on the web page, the share user interface component for allowing a first user to choose an option to share purchasing of the item with others;

receiving purchase order information associated with the item entered on the web page, from the first user;

storing initially the received purchase order information from the first user in a memory device without completing a purchase transaction associated with the item;

responsive to the first user choosing the share user interface component, and prior to completing the purchase transaction associated with the item, presenting a list of one or more second users from which the first user is allowed to select;

receiving the selected one or more second users responsive to the first user selecting the one or more second users;

automatically launching and opening a second user interface on one or more devices respectively of the selected one or more users, the second user interface having at least some of the purchase order information populated on the second user interface, responsive to determining the selected one or more second users are online and browsing to purchase the item; and if it is determined that a minimum subset of the selected one or more second users have indicated to purchase a same instance of the item, completing the purchase transaction associated with the item.

14. The computer readable storage medium of claim 13, wherein the web page includes a web browser page displaying a web page of a web server, and the selection component is included on the web page.

15. The computer readable storage medium of claim 13, further including:

automatically sending a electronic mail to the selected one or more users;

automatically sending an electronic message to the selected one or more users; or automatically posting a notification on a social network page of the selected one or more users; or combinations thereof.

16. The computer readable storage medium of claim 13, wherein the method further includes automatically dividing cost of the item among the first user and the selected one or more users.

17. The computer readable storage medium of claim 13, wherein the item is associated with an event occurring in specified timeframe, the specified timeframe including time, date or day of week or combinations thereof, and electronic calendar systems associated with the first user and the selected one or more second users are automatically updated with posting of said event on said specified timeframe, or the electronic calendar systems are automatically searched to find commonly available time within said specified timeframe wherein the event is posted on the electronic calendar systems at the commonly available time, or combinations thereof.

* * * * *